UNITED STATES PATENT OFFICE.

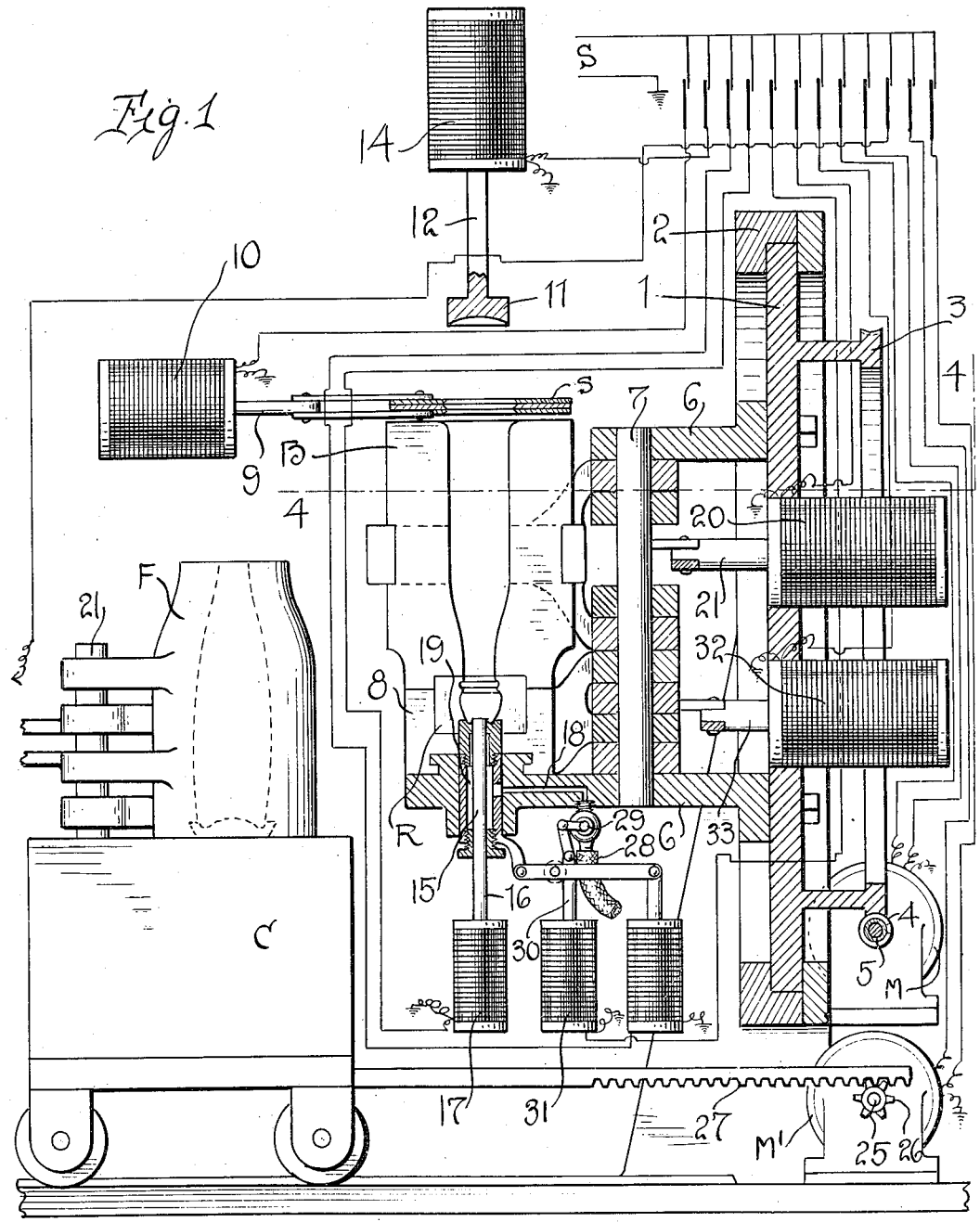

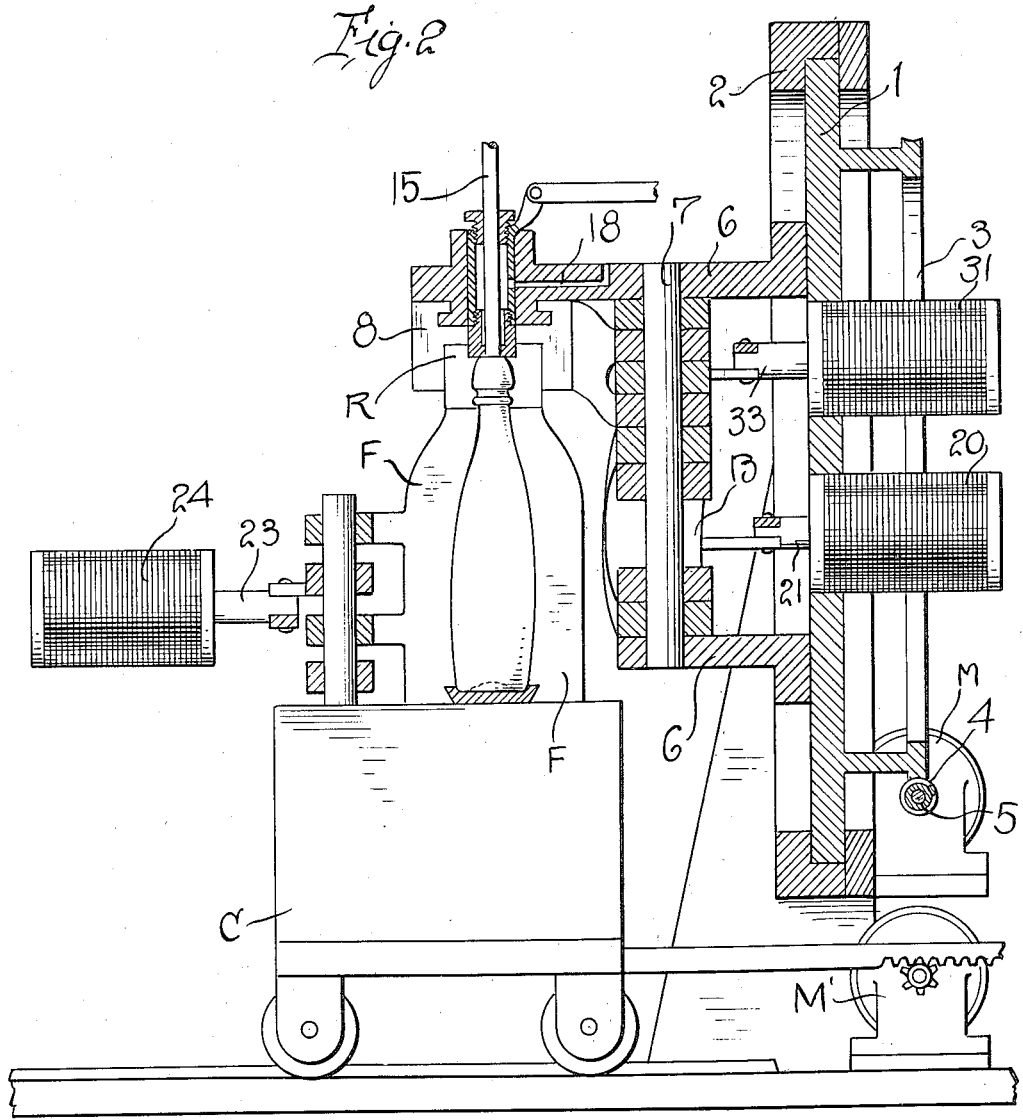

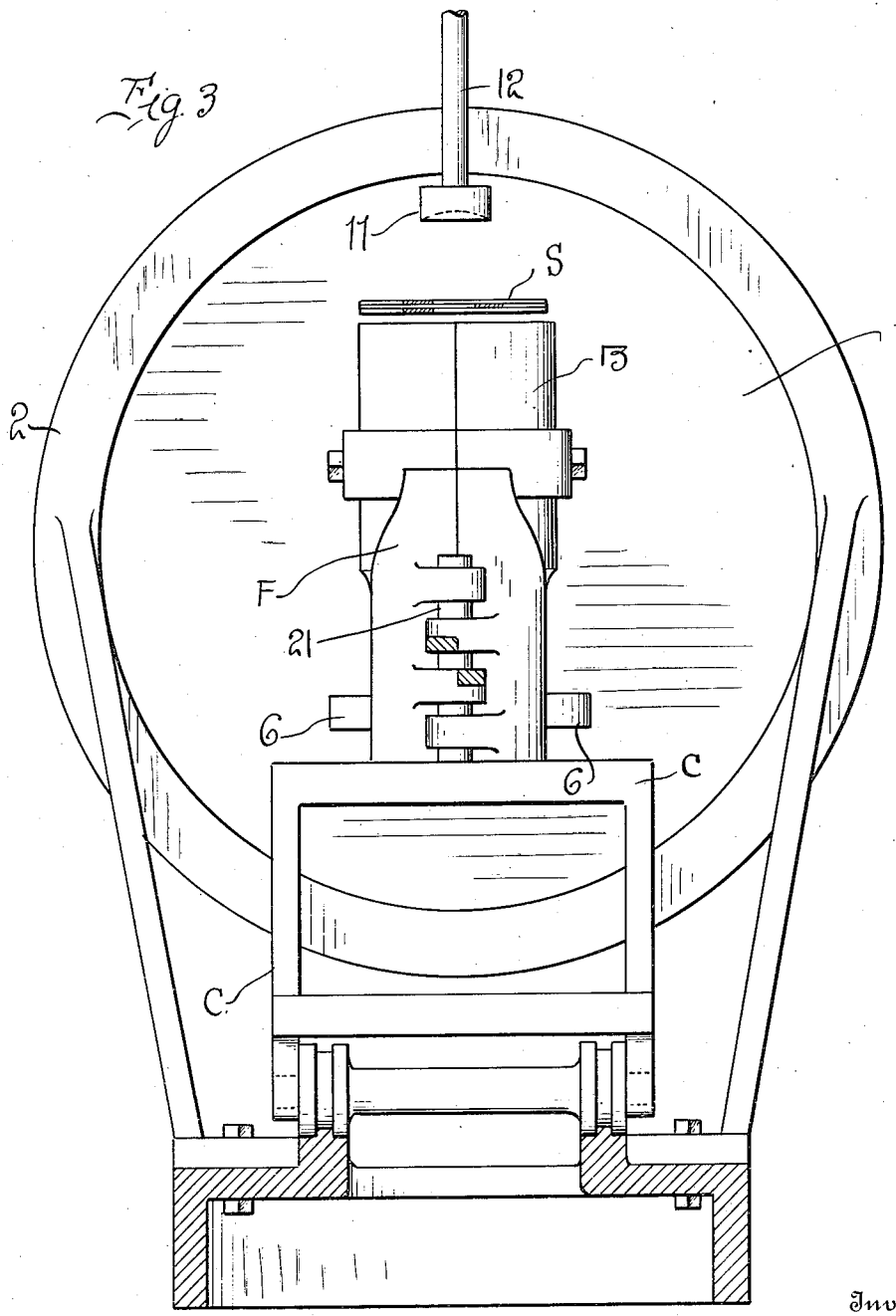

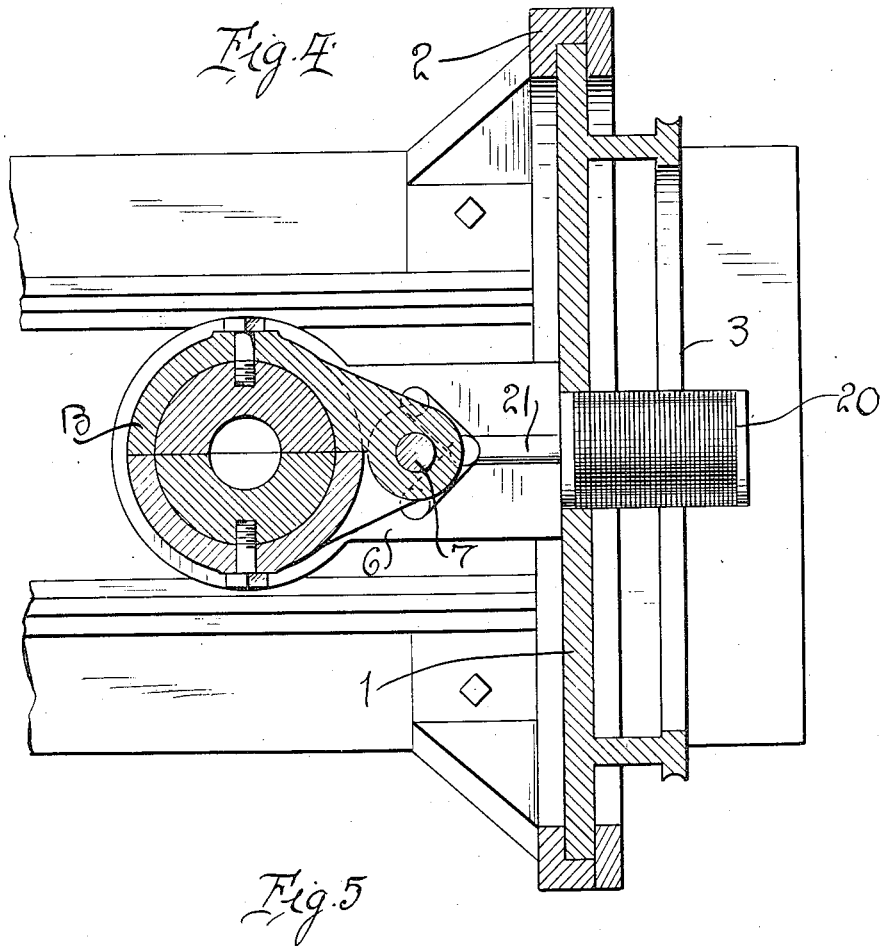

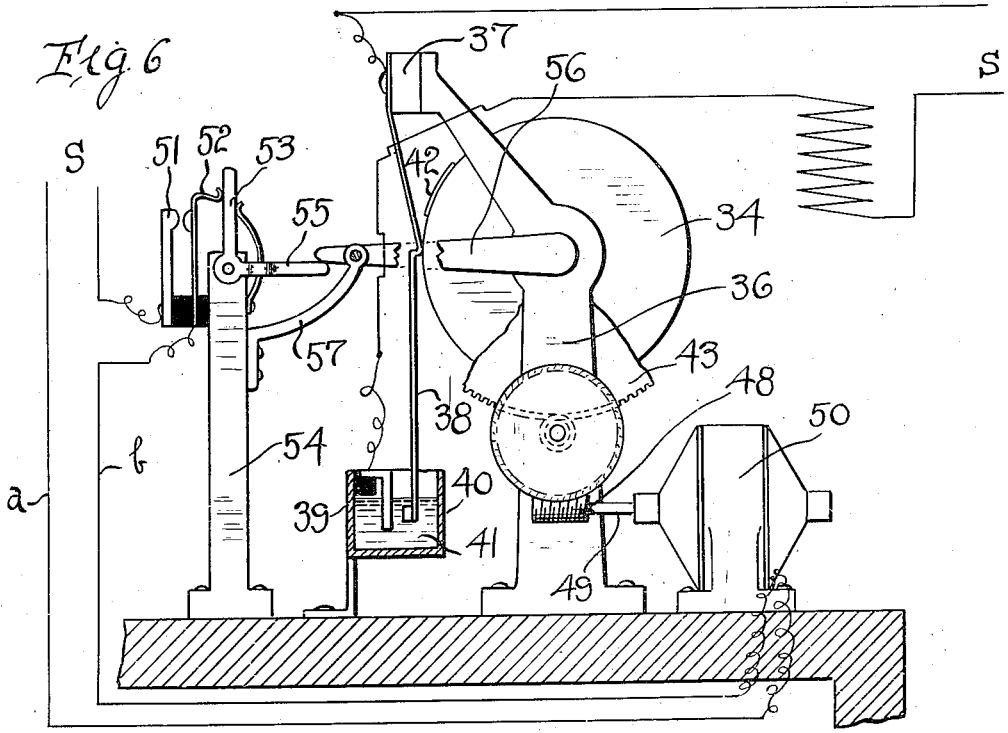
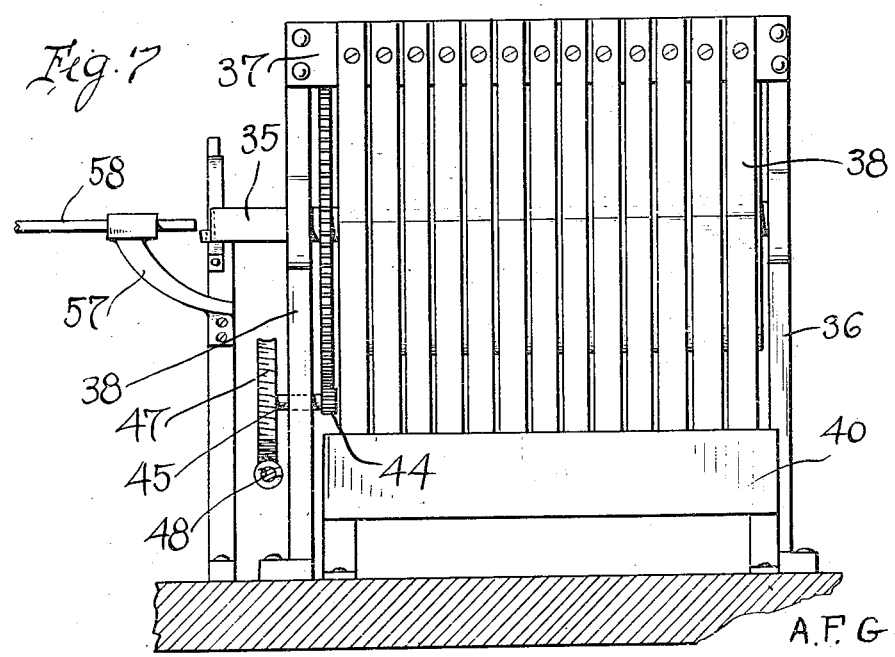

ALBERT F. GUMPP AND WILLIAM J. JOHNSON, OF SMETHPORT, PENNSYLVANIA.

GLASS-SHAPING APPARATUS.

1,169,953. Specification of Letters Patent. Patented Feb. 1, 1916.

Application filed November 30, 1914. Serial No. 874,887.

*To all whom it may concern:*

Be it known that we, ALBERT F. GUMPP and WILLIAM J. JOHNSON, citizens of the United States, residing at Smethport, in the county of McKean and State of Pennsylvania, have invented certain new and useful Improvements in Glass-Shaping Apparatus, of which the following is a specification, reference being had to the accompanying drawings.

This invention relates to certain improvements in glass shaping apparatus, and the object of the invention is to provide a device of this general character wherein the several operations thereof are created in an automatic manner whereby the completed article may be produced with a minimum of labor.

The invention consists in the details of construction and in the combination and arrangement of the several parts of our improved glass shaping apparatus whereby certain important advantages are attained and the device is rendered simpler, less expensive and otherwise more convenient and advantageous for use, all as will be hereinafter more fully set forth.

The novel features of the invention will be carefully defined in the appended claims.

In order that our invention may be the better understood, we will now proceed to describe the same with reference to the accompanying drawings, wherein—

Figure 1 is a diagrammatic view, with certain of the parts in elevation and certain in section, of a glass machine constructed in accordance with an embodiment of our invention; Fig. 2 is a view similar to Fig. 1, but showing certain of the parts in a different adjustment; Fig. 3 is a fragmentary view, partly in end elevation and partly in section, of the apparatus as disclosed in Fig. 1; Fig. 4 is a sectional view taken substantially on the line 4—4 of Fig. 1; Fig. 5 is a fragmentary view, detached, and in top plan of the shearing mechanism herein embodied, the operating means being diagrammatically set forth; Fig. 6 is an enlarged view, partly in elevation and partly in section, of the automatic controlling mechanism for the machine, an operating circuit being diagrammatically disclosed; and Fig. 7 is a view, partly in front elevation and partly in section, of the device as illustrated in Fig. 6.

In the form of invention herein disclosed, the machine is set forth as particularly adapted for use in the production of bottles. We wish to state, however, that it is not our desire to limit ourselves in this particular respect, as it is to be understood that the invention may be employed with equal facility in the production of hollow ware of any kind and in certain instances and as the requirements of practice may dictate, certain of the steps herein set forth may be omitted, as the essential feature of our invention is the provision of means whereby the various steps in the operation may be effected in an automatic manner. It is also to be observed that the minor details of construction are not disclosed as we do not wish to lay any particular stress on the same for the reason that it will be self-evident that the parts of the invention diagrammatically disclosed in the drawings may be operatively applied in any manner which best suits the practical requirements.

As disclosed in the accompanying drawings, 1 denotes a disk member adapted to rotate around a vertical axis and herein disclosed as operatively supported within the circular guide-way 2. The rear face of the member 1 is provided with the annular worm 3 disposed concentric to the axial center of the member 1 and in mesh with the worm 4 carried by the driven shaft 5 of the motor M of a conventional type and adapted to be electrically operated in a manner to be hereinafter more particularly referred to.

Projecting forwardly of the member 1 are the radially alined arms 6 tied or connected adjacent their free extremities by the shaft 7 which serves as a pintle for the sections of the blank mold B, the ring mold R and the arms 8 of the ring mold R.

S denotes the relatively movable shearing blades which are automatically caused to cut the glass when placed in the blank mold B by the gatherer, such cutting operation being under the influence of the core 9 of the magnet 10, said magnet 10 being adapted to be energized in a manner to be hereinafter more particularly referred to, it being understood that the reverse movement of the core 9 is accomplished through the medium of any mechanical means which it is not believed necessary to describe or illustrate in detail. This is also true of the remainder of the magnets, to be hereinafter referred to.

After the shears S have performed their function, the plunger 11 carried by the core 12 under the influence of the magnet 14 is directed through the assembled mold B to properly compress the glass or force the same within the ring mold R whereupon the plunger 11 is retracted. The electrical control of the magnet 14 will be hereinafter more fully set forth. After the plunger 11 is retracted, the plunger 15, constituting the outer extremity of the core 16 under the influence of the magnet 17, is forced upwardly through the ring mold R and partly into the blank mold B and then mechanically withdrawn below the air inlet 18 in communication with the nipple 19. At the completion of the retractible movement of the plunger 15, the motor M is energized and through the operative connection afforded by the worms 3 and 4, the disk member 1 is caused to make a one-half revolution so that the molds B and R will be in the inverted position shown in Fig. 2. The magnet 20 is then energized to impart the requisite movement to the core 21 whereby the sections of the blank mold B are caused to open away from the glass which has been previously deposited within the blank mold B and such glass is then left hanging from the ring mold R. The motor M' is then energized and caused to draw below the ring mold R the carriage C having mounted thereon the finishing mold F, herein disclosed as comprising two sections hingedly engaged with the upstanding shaft 22 carried by the carriage C and such sections of the mold F under the influence of the core 23 of the magnet 24 are adapted to close around the glass. While any means may be employed for creating the requisite operative engagement between the carriage C and the motor M', I herein disclose the shaft 25 of the motor provided with a gear 26 in mesh with a rack bar 27 projecting from the carriage C, as is shown clearly in Figs. 1 and 2 of the accompanying drawings.

The air inlet 18 is in communication with a suitable source of air pressure through a conventional conduit 28 having interposed therein the controlling valve 29 operatively connected with the core 30 of the magnet 31 and which core is caused to operate under the influence of the magnet 31 immediately after the flask F has been disposed around the glass hanging or depending from the mold R whereby the glass is blown to the shape of the finishing mold F, as is believed to be self-evident. Upon deënergizing of the magnet 31, the core 30 is mechanically moved to close the valve 29 and the magnet 32 is energized to move the core 33 to cause a separation of the sections of the ring mold R, said core 33 being operatively engaged with the arms 8 thereof. The motor M' is then again energized but in a reverse direction which causes the carriage C to move away from under the ring mold R with a finished bottle therein and whereupon the various operations, hereinbefore referred to, are reversed and the parts assume the positions shown in Fig. 1.

The means for controlling the several operations of the machine as hereinbefore set forth is particularly disclosed in Figs. 6 and 7 of the drawings wherein is disclosed a drum 34 carried by a shaft 35 operatively supported by the uprights 36, the upper extremities of the uprights 36 being tied or connected by the cross bar 37, from which depend a plurality of spring contacts 38 adapted to coact with the stationary contacts 39 positioned within the tank 40 adapted to contain a suitable non-conductive liquid 41 whereby the creation of an electric spark is prevented when the engagement between a contact 38 and 39 is broken. Produced on the periphery of the drum 34 are the segments 42 of predetermined lengths and adapted to serve in the nature of cams to properly engage the contacts 38 and force the same into engagement at the requisite period with their coacting contacts 39, it being readily perceived that the length of the segments 42 determines the period of time the coacting magnets of the machine are energized, and the positioning of such segments 42 serves to determine the sequence in which the several magnets will be energized.

A full operation of the machine is adapted to be completed upon a single rotation of the drum 4 and, as herein set forth, the shaft 35 on which the drum 4 is mounted is provided with a gear 43 in mesh with a similar gear 44 of a required ratio fixed to a stub shaft 45 operatively supported by one of the uprights 36, said shaft 45 being also provided with a worm gear 47 in mesh with a worm 48 carried by the driving shaft 49 of the motor 50, said motor being in communication with a suitable source of electrical energy through the medium of the conductors $a$ and $b$. One of the conductors, as $b$, has interposed therein a circuit breaker comprising the fixed contact 51 and the movable contact 52 which is maintained in proper engagement with the stationary contact 51 through the medium of the spring pressed arm 53 pivotally supported by an upright 54. The arm 53 is also provided with a rock arm 55 adapted to be engaged by the extremity of a rock arm 56 carried by the shaft 35 of the drum whereby it will be perceived that upon the completion of a single revolution of the drum 34, or more particularly the shaft 35, the arm 56 will so engage the arm 55 as to cause the movable contact 52, under its inherent resiliency, to disengage the contact 51 and thus bring the machine to a stop. The upright 54 is provided with an inwardly disposed bracket 57 through which is directed the endwise movable member 58 adapted for engagement with the arm 56 when forced inwardly by the operator whereby said arm 56 is disengaged from the rock arm 55 whereupon the spring pressed arm 53 will force the contact 52 into engagement with the contact 51 whereby the machine will be again caused to operate.

From the foregoing description, it is thought to be obvious that a glass shaping apparatus constructed in accordance with our invention is of an extremely simple and comparatively inexpensive nature and is particularly well adapted for use by reason of the convenience and facility with which it may be assembled, and it will also be obvious that our invention is susceptible of some change and modification without material departure from the principles and spirit thereof and for this reason we do not wish to be understood as limiting ourselves to the precise arrangement and formation of the several parts herein shown in carrying out our invention in practice.

We claim:

1. A machine for the manufacture of glass ware comprising a revoluble member, electrical means for imparting rotary movement thereto, a blank mold carried by the member and comprising relatively movable sections, electrical means for imparting movement to the sections, a circuit closer interposed in each of the electrical means, and a rotatable element, said element being provided with means coacting with the circuit closers for closing the same in proper sequence.

2. A machine for the manufacture of glass ware comprising a plurality of movable elements, electrical means for each of the elements for imparting the requisite movement thereto and including a circuit-closer, said closer comprising a stationary contact and a movable contact, a rotatable element, cams carried by the rotatable element and adapted to force the movable contacts into engagement with their coacting stationary contacts in proper sequence, means for imparting movement to the rotary element, and means for automatically stopping the movement of the rotary element when such element has completed a single revolution.

3. A machine for the manufacture of glass ware comprising a plurality of movable elements, electrically controlled means for each of said elements for operating the same, a circuit closer interposed in each of the electrical means, a rotatable element, said element being provided with means coacting with the circuit closer for closing the same in proper sequence during a single revolution of the rotatable element, means for imparting movement to the rotary element, and means for automatically stopping the movement of the rotary movement when said element has completed a single revolution.

In testimony whereof we hereunto offer our signatures in the presence of two witnesses.

ALBERT F. GUMPP.
WILLIAM J. JOHNSON.

Witnesses:
 J. W. VOORHEES,
 GEO. W. SENN.